Patented Aug. 5, 1941

2,251,895

UNITED STATES PATENT OFFICE 2,251,895

PRODUCTION OF TETRAHYDROFURANES

Walter Reppe, Otto Hecht, and Adolf Steinhofer, Ludwigshafen-on-the-Rhine, Germany, assignors, by mesne assignments, to General Aniline & Film Corporation, New York, N. Y., a corporation of Delaware No Drawing. Application October 4, 1938, Serial No. 233,248. In Germany October 29, 1937

1 Claim. (Cl. 260—345)

The present invention relates to the production of tetrahydrofuranes.

It is already known that by heating 1.4-butyleneglycol with sulfuric acid or hydrochloric acid tetrahydrofurane is obtained. Undesirable side-reactions occur, however, so that the yields of tetrahydrofurane are not satisfactory.

We have now found that tetrahydrofuranes are obtained in very good yields by distilling 1.4-butyleneglycols in the presence of solid catalysts promoting the splitting off of water. The reaction may be carried out by heating a mixture of the 1.4-butyleneglycol with the dehydration catalyst so that a mixture of tetrahydrofurane and water distils off.

Suitable catalysts of this kind are in particular polyvalent metal oxides and metal salts, as for example oxides of barium, zinc, aluminium, titanium, zirconium or thorium, sulphates of aluminium and copper, neutral and acid phosphates, e. g. of alkali and alkali earth metals, or of aluminium, iron, cerium, silver and uranium, chlorides of magnesium, calcium, zinc and aluminium, and also silicic acid gel, bleaching earths, organic acids, such as oxalic acid or para-toluene sulphonic acid, and acid anhydrides. Mixtures of the said agents for splitting off water may also be used. Depending on the working conditions there are obtained tetrahydrofuranes more or less mixed with the water formed by the reaction; these may be dried by treatment with dehydrating agents, as for example anhydrous calcium chloride, potassium carbonate or anhydrous sodium sulphate, and purified by distillation. The tetrahydrofuranes may also be purified without previous drying by direct fractional distillation, if desired also in a continuous operation.

The reaction may also be carried out under increased or reduced pressure, if desired also in a cycle. Contrasted with the use of the usual strongly dehydrating liquid, and in part volatile, catalysts, such as sulphuric acid or hydrochloric acid, the use of solid catalysts which split off water offers the advantage that the reaction mixture resinifies to a less extent and that the distillate is obtained free from the dehydrating agent used.

The process is applicable not only to 1.4-butyleneglycol but also to its alkyl, aryl, cycloaryl or aralkyl substitution products.

The following examples will further illustrate how this invention may be carried out in practice but the invention is not restricted to these examples. The parts are by weight.

Example 1

1 part of anhydrous aluminium chloride is added to 90 parts of 1.4-butyleneglycol and the whole heated to from 155° to 165° C. The splitting off of water sets in and there distils over a mixture of tetrahydrofurane and water from which 62 parts of pure tetrahydrofurane may be recovered.

Example 2

20 parts of anhydrous zinc chloride are added to 200 parts of 1.4-butyleneglycol and the mixture of tetrahydrofurane and water formed is distilled off at a temperature of from 180° to 199° C. After drying the distillate over potassium carbonate, 102 parts of tetrahydrofurane boiling at from 64° to 66.5° C. are obtained.

If 200 parts of 1.4-butyleneglycol be reacted in the same way with 20 parts of anhydrous magnesium chloride, there distil over at a temperature of from 150° to 180° C. 176 parts of a mixture of water and tetrahydrofurane from which by drying and distilling there are obtained 92 parts of pure tetrahydrofurane. With 20 parts of granular anhydrous calcium chloride under otherwise identical reaction conditions there are obtained at a temperature of from 180° to 188° C. 165 parts of crude distillate which can be converted into pure tetrahydrofurane by drying and distilling.

Example 3

90 parts of 1.4-butyleneglycol are mixed with 1 part of para-toluene sulphonic acid and the mixture heated to from 140° to 160° C. The aqueous mixture thus distilling over yields 65 parts of tetrahydrofurane after drying. Tetrahydrofurane is also obtained when the para-toluene sulphonic acid is replaced by anhydrous oxalic acid.

The reaction proceeds in a similar manner when using succinic or maleic anhydride as the agent for splitting off water.

Example 4

90 parts of 1.4-butyleneglycol are heated to 190° C. with 2 parts of dehydrated copper sulphate. By drying and distilling the aqueous mixture which distils off there are obtained 67 parts of tetrahydrofurane.

By using 0.5 part of potassium aluminium sulphate instead of copper sulphate and heating to from 190° to 200° C., 68 parts of tetrahydrofurane are obtained after drying.

Example 5

20 parts of potassium pyrosulphate are added to 200 parts of 1.4-butyleneglycol and heated. A mixture of tetrahydrofurane and water commences to distil off even at 126° C. In the course of the reaction the temperature is raised to 137° C. 174 parts of a colorless distillate are obtained from which 110 parts of pure tetrahydrofurane are obtained after drying over potassium carbonate.

If 1.4-butyleneglycol be heated with 10 per cent of its weight of active aluminium oxide to from 185° to 201° C., 92.5 per cent of the 1.4-butyleneglycol distil over in the form of a mixture of tetrahydrofurane and water.

Similar results are obtained when using aluminium sulphate or bauxite as catalysts.

The reaction may also be carried out with aqueous solutions of 1.4-butyleneglycol which may be obtained by hydrogenation of butin-2-diol-1.4 in aqueous solution. When heating such aqueous solutions in the presence of aluminium oxide, first the water is distilled off and then, at from 185 to 205° C. a mixture of equimolecular proportions of tetrahydrofurane and water is distilling off.

What we claim is:

In the production of tetrahydrofuranes from 1.4-butyleneglycols the step which consists in heating a liquid 1.4-butyleneglycol in the presence of aluminium oxide at a temperature at which a mixture of tetrahydrofurane and water distils off.

WALTER REPPE.
OTTO HECHT.
ADOLF STEINHOFER.